3,321,394
METHOD FOR RENDERING AN ASPHALT OR ASPHALTENE PRODUCT COLLECTED IN THE SEPARATION ZONE OF A SOLVENT EXTRACTION APPARATUS FREE FLOWING BY DISPERSING AN IMMISCIBLE LIQUID THEREWITH
King L. Mills, Bartlesville, Okla., assignor to Phillips Petroleum Company, a corporation of Delaware
Filed Oct. 5, 1964, Ser. No. 401,426
7 Claims. (Cl. 208—45)

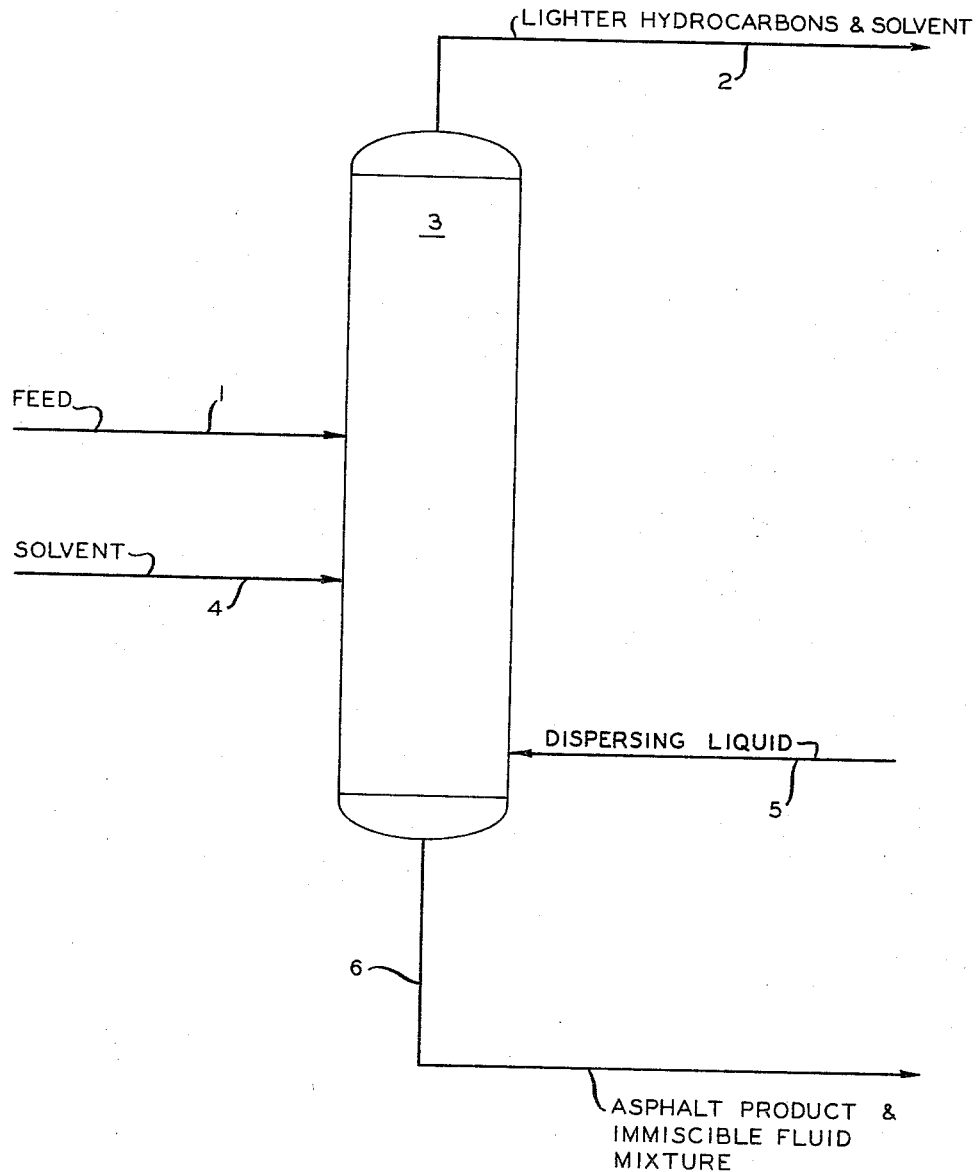

This invention relates to a method and apparatus for deasphaltenizing a hydrocarbon material.

It is known to use light hydrocarbons such as propane, isobutane, normal butane and isopentane, or mixtures of these materials, to separate oils and distillates into two fractions, a lower molecular weight paraffinic extract and a high molecular weight raffinate. However, it is also possible to use certain normal paraffins and iosparaffins to precipitate insoluble materials such as asphalt and asphaltenes and thereby remove same from oils and resins contained in the same feed material. Heretofore in such operations, and especially in continuous operations, the apparatus utilized contained baffles, packing, or the like. In such cases, and even in cases where there is no packing or baffles present, it has been extremely difficult to remove hard asphalt at low temperature and almost impossible to remove asphaltenes from the apparatus.

According to this invention there is provided a method and apparatus wherein an asphalt-containing feed is treated with a solvent material to precipitate therefrom an asphaltic product and then rendering said product free-flowing with a dispersing liquid which is immiscible with the asphaltic product and solvent and which is of substantially the same density as the asphaltic product. There is thus produced a mixture of asphaltic product and liquid which is quite fluid and thereby improves the asphaltic product removal operation by causing the product to flow freely and rapidly, thereby preventing compaction of same in the apparatus.

Accordingly, it is an object of this invention to provide a new and improved method and apparatus for producing asphaltic products. It is another object of the invention to improve the efficiency in overall output of an asphaltic material producing operation.

Other aspects, objects and the several advantages of the invention will be readily apparent to those skilled in the art from the following description, the drawing and the appended claims.

The drawing shows in diagrammatic form an asphalt separation operation utilizing the invention.

More specifically, the drawing shows the separation zone 3 into which is fed by 1 a suitable asphalt-containing feed material. The feed material for this operation can be any suitable asphalt-containing material which can be treated with known solvents to separate the asphalt therefrom. Generally, the feed material can be crude oil, topped crude oil, or residue, i.e., crude oil which has been atmospherically distilled and vacuum distilled. Suitable feedstocks for this invention include a topped crude oil having a boiling point of at least 700° F. and a viscosity greater than 150 Saybolt oil test at 122° F. and a gravity, ° A.P.I., of at least zero. This invention is well suited to treating Monogas crude oil.

The asphalt product of this invention will vary in density over a wide range but will generally fall within the range of about 0.9 to about 1.2 grams/cubic centimeter. Generally, the asphalt produced will have an ASTM D–5–52 penetration of 0 to 200, preferably 20 to 150, at 77° F., under a load of 100 grams for 5 seconds and an ASTM D–113–44 ductility of 5 to 160, preferably 100 to 160, centimeters at 77° F. The asphalt produced will also have an ASTM D–36–26 ring and ball softening point of 100 to 450° F., preferably 110 to 230° F.

The asphaltenes product of this invention is a hard particulate material insoluble in paraffin naphtha and having a molecular weight from 1000 to at least 2500. The asphaltenes of this invention are that portion of the asphalt which is insoluble in normal pentane at room temperature and at a n-pentane/asphalt dilution ratio of 5/1 to 100/1, preferably 20/1.

Thus, it can be seen that the asphalt product can be quite viscous and therefore substantially non-flowing. The asphaltic product can be in the form of a semisolid mass or be in the form of solid particles in the case of asphaltenes, both of which tend to compact in the apparatus used to form them and thereby impede or stop the asphalt-separating operation. In other words, the asphalt product treated by this invention will generally not be sufficiently fluid to flow by itself through the apparatus.

At a point on said separation zone below the inlet of said feed material, there is introduced by 4 a solvent for contacting said feed material and separating therefrom the desired asphaltic product. By this process an asphaltic oil is commingled with solvent in the liquid state, producing an oil-solvent solution phase, and an asphaltic or asphalt-solvent phase. The two phases separate, by differences in specific gravity, the asphalt phase settling and the oil solution rising in zone 3. At the top of zone 3, the quantity of oil in the oil-solvent solution can be reduced by elevating the temperature in that section, thereby precipitating the oil and resinous material contained therein, the precipitated oily droplets settling by gravity and flowing in contact with, and in counter current to, a paraffinic oil-solvent solution and fresh solvent whereby the precipitated oily droplets are washed substantially free of paraffinic oil, leaving in the precipitated phase the asphaltic and resinous material.

Generally, the solvents utilizable in this invention include any material capable of separating asphalt or asphaltenes from the feed material. Solvents which can be employed to produce asphaltenes include normal paraffins and isoparaffins having from 5 to 7 carbon atoms and include normal pentane, isopentane, normal hexane, isohexane, and the like. The solvents which can be employed to produce asphalt include normal paraffins and isoparaffins having 3 or 4 carbon atoms and include propane, isobutane, and mixtures of these solvents.

The lighter hydrocarbons and other materials which are extracted from the original feed material by the solvent and the solvent are passed from the zone by 2 for further treatment as desired. The asphalt material separated from the original feed material collects at the bottom of zone 3 and therein is contacted with a dispersing liquid by means of 5 to produce the desired free-flowing mixture of liquid and asphalt.

The dispersing liquids which can be employed in this invention include any liquid which is immiscible with the asphaltic product, i.e., asphalt or asphaltenes, and the solvent used to precipitate the asphaltic product from the feed material. The dispersing liquid can vary in density within the range of from about 20 weight percent less to about 20 weight percent more than the asphaltic phase density, and preferably from 5 weight percent less to 5 weight percent more than the asphaltic phase density. Although water is a preferred liquid, other inorganic and organic liquids can be employed. For example, glycol, butanol and other alcohols, preferably having from 1 to 8 carbon atoms, per molecule, can be used alone or in a mixture with water and with each other. Similarly, inorganic solutions such as aqueous solutions of organic and inorganic salts such as alkali metal salts of fatty acids and of halides, can be employed. If during operation the density of the asphalt phase changes due to operational variations, the density of the dispersing liquid can also be changed. For example, if water is the basic dispersing liquid employed and it is found that the asphaltic product has decreased in density from the density of the material first produced, a glycol or an alcohol or other less dense liquid can be mixed with the water to produce a dispersing liquid mixture which has a density less than water and therefore is more nearly equal to that of the asphaltic product. Similarly, materials could be added to the water to increase its density if the density of the asphaltic product becomes greater than water. Such materials include salts such as sodium chloride and calcium chloride. Also, instead of adding the salt per se to water a salt solution could be added. Thus, it can be seen that the scope of the invention includes dispersing liquids of varying density or of densities which can be or are varied during the asphaltic separation process in order to maintain the density of said liquids substantially the same as that of the asphaltic product.

It is also within the scope of this invention to employ in the dispersing liquid emulsifying, wetting and/or dispersing agents which will help disperse the ashphaltic product and thereby provide a more intimate mixture of asphaltic product and dispersing liquid so that the ultimate mixture is even more free-flowing than it would be if the basic dispersing fluid were utilized alone. Suitable dispersing agents include soap and commercial detergents and melting agents.

The mixture of asphaltic product and dispersing liquid is removed from the zone by 6 for removal of the dispersing liquid from the asphaltic product and further treatment of the asphaltic product as desired.

Generally, the temperatures employed in the separation operation will vary over a wide range depending on the type of feedstock, solvent, and dispersing liquid utilized, and the yield desired. However, the temperature will generally be from about 50° to about 500° F., but this is not a fixed range, for example, when propane is utilized the solvent temperature can vary from about 50° to about 220° F. The upper limit is the important temperature of the solvent-oil phase. Similarly, the pressure employed in the operation will vary over a wide range, depending again on the type of feedstocks, solvent and the like employed in each separate operation. Generally, the pressure will be that sufficient to maintain all of the materials present in the liquid phase. The solvent to feed ratio will also vary over a wide range depending on the particular materials employed but will generally be in the range of 2/1 to 100/1, preferably 5/1 to 20/1.

EXAMPLE

A topped crude feedstock having a gravity of 19° A.P.I., a Saybolt viscosity at 122° F. of 172, and 10 and 50 weight percent distillation temperatures of 800° F. and 980° F., respectively, is passed to a separation zone at the rate of 100 volumes per unit time.

Normal pentane is passed into the separation zone for contacting with the topped crude feed at the rate of 1000 volumes per unit of time. The separation zone is maintained at a temperature of 385° F. and 207 p.s.i.a. Resins and oil at the rate of 93 volumes per unit time and normal pentane at the rate of essentially 1000 volumes per unit of time are removed from the top of said zone. Water at the rate of 50 volumes per unit of time is introduced into the bottom of said zone and therein mixed with asphaltenes removed from the topped crude feed by the normal pentane solvent. The mixture of asphaltenes dispersed in water is removed from the bottom of the zone at the rate of 7 volumes of asphaltene per unit of time and 50 volumes of water per unit time. In this operation 7 weight percent of asphaltenes based on the weight of the crude feed, are precipitated from the topped crude feed material by the normal pentane solvent. The asphaltenes have a density of about 1.1 grams/cubic centimeter, and the dispersing liquid has a density of about 0.997 gram/cubic centimeter.

It should be noted that this invention can be employed in any system which involves precipitating a material from a mother liquor by use of a solvent. Generally, when a desirable material is in a solution and is precipitated therefrom, this invention is applicable. For example, when polymer is precipitated from a solution in particle form, this invention can be employed to maintain the polymer so precipitated in a fluidized and free-flowing form.

Reasonable variations and modifications of the invention will become apparent to those skilled in the art and the illustrative details disclosed are not to be construed as imposing unnecessary limitations on the invention.

I claim:

1. A method of producing an asphaltic product comprising separating at least one material selected from the group consisting of asphalt and asphaltenes from a feed containing same by contacting said feed in an upper portion of a separation zone with a solvent which forces said asphaltic product out of said feed, collecting said asphaltic product in the bottom portion of said zone, mixing with said collected asphaltic product a dispersing liquid which is immiscible with said asphaltic product and said solvent and being of a density substantially the same as said asphaltic product to render same substantially free-flowing, said density being in the range of from about 20 weight percent less to about 20 weight percent more than the density of said asphalt, and removing said substantially free-flowing mixture of liquid and asphaltic product from said zone.

2. A method of producing asphalt comprising providing an asphalt-containing feed, contacting said feed in an upper portion of a separation zone with a solvent comprising at least one material selected from the group consisting of normal paraffins and isoparaffins having at least 3 and not more than 4 carbon atoms to precipitate asphalt therefrom, collecting said asphalt in a bottom portion of said zone, mixing with said collected asphalt at least one dispersing liquid selected from the group consisting of water, glycol, alcohols, aqueous solutions of glycol, aqueous solutions of alcohols, and aqueous solutions of organic and inorganic salts, the material selected being immiscible with said asphalt and said solvent and being of a density substantially the same as said asphalt to produce a fluid mixture of liquid and asphalt, said density being in the range of from about 20 weight percent less to about 20 weight percent more than the density of said asphalt, and separating said mixture from said zone.

3. The method of claim 2 wherein said dispersing liquid has a density in the range of about 5 weight percent less to about 5 weight percent more than the density of said asphalt in the separation zone.

4. The method of claim 2 wherein said asphalt product has a density in the range of about 0.9 to about 1.2 and said dispersing liquid has a density of about 0.7 to about 1.4.

5. The method of claim 2 wherein said dispersing liquid is adjusted in its density by the addition of at least one material which will alter the density thereof so as to more nearly approximate the density of said asphalt produced.

6. The method of producing asphaltenes comprising providing an asphaltene-containing feed, contacting said feed in an upper portion of a separation zone with a solvent comprising at least one material selected from the group consisting of normal paraffins and isoparaffins having in the range of from 5 to 7 carbon atoms to precipitate asphaltenes therefrom, collecting said asphaltenes in a bottom portion of said zone, mixing with said collected asphaltenes at least one dispersing liquid selected from the group consisting of water, glycol, alcohols, aqueous solutions of glycol, aqueous solutions of alcohols and aqueous solutions of organic and inorganic salts, the material selected being immiscible with said asphaltenes and said solvent and being of a density substantially the same as said asphaltenes to produce a fluid mixture of liquid and asphaltenes, and separating said mixture from said zone said density being in the range of from about 20 weight percent less to about 20 weight percent more than the density of said asphalt.

7. A method of producing an asphaltic product comprising providing a topped crude oil having a boiling point of at least 700° F., a viscosity greater than 150 Saybolt oil test at 122° F. and a gravity of at least 0° A.P.I., introducing at a point on said zone which is in the lower half thereof a solvent which forces said asphaltic product out of said feed, contacting in an upper portiton of said zone said feed and said solvent to precipitate said asphaltic product, collecting said asphaltic product in an area of said zone which is below the point of introduction of said solvent, mixing with said collected asphaltic product an aqueous solution of a density substantially the same as said asphaltic product to produce a fluid mixture of said solution and said asphaltic product and separating said mixture from said zone said density being in the range of from about 20 weight percent less to about 20 weight percent more than the density of said asphalt.

References Cited by the Examiner
UNITED STATES PATENTS

| | | | |
|---|---|---|---|
| 2,088,497 | 7/1937 | Tijmstra | 196—14.52 |
| 2,154,493 | 4/1939 | Cooke et al. | 208—45 |
| 2,759,872 | 8/1956 | Claridge et al. | 196—14.52 |
| 2,919,239 | 12/1959 | Ludwig | 208—39 |
| 3,053,751 | 9/1962 | Garwin | 208—45 |
| 3,159,571 | 12/1964 | Reman et al. | 208—39 |

DANIEL E. WYMAN, *Primary Examiner.*

P. E. KONOPKA, *Assistant Examiner.*